US008425304B2

(12) United States Patent
Gagner et al.

(10) Patent No.: US 8,425,304 B2
(45) Date of Patent: Apr. 23, 2013

(54) GAMING SYSTEM HAVING GRAPHICAL FEATURE INTERFACE

(75) Inventors: Mark B. Gagner, West Chicago, IL (US); Damon E. Gura, Chicago, IL (US); Jeremie D. Moll, Chicago, IL (US); Darren Ng, Chicago, IL (US); Tracey Wright, West Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 230 days.

(21) Appl. No.: 12/665,632

(22) PCT Filed: Jun. 11, 2008

(86) PCT No.: PCT/US2008/007256

§ 371 (c)(1), (2), (4) Date: Dec. 18, 2009

(87) PCT Pub. No.: WO2008/156596

PCT Pub. Date: Dec. 24, 2008

(65) Prior Publication Data

US 2010/0323779 A1 Dec. 23, 2010

Related U.S. Application Data

(60) Provisional application No. 60/936,174, filed on Jun. 19, 2007.

(51) Int. Cl.
*A63F 13/00* (2006.01)

(52) U.S. Cl.
USPC ................................................ 463/20; 463/29

(58) Field of Classification Search .................... 463/20, 463/23, 29, 31
See application file for complete search history.

(56) References Cited

U.S. PATENT DOCUMENTS

| | | | | |
|---|---|---|---|---|
| 5,544,892 A | 8/1996 | Breeding | ...................... | 273/292 |
| 6,379,246 B1 | 4/2002 | Dabrowski | ...................... | 463/16 |
| 7,335,106 B2 | 2/2008 | Johnson | ...................... | 463/42 |
| 2003/0003988 A1 * | 1/2003 | Walker et al. | .................. | 463/21 |
| 2003/0119579 A1 * | 6/2003 | Walker et al. | .................. | 463/20 |

(Continued)

FOREIGN PATENT DOCUMENTS

| | | |
|---|---|---|
| EP | 1 283 508 A2 | 2/2003 |
| WO | WO 02/065258 A2 | 8/2002 |

OTHER PUBLICATIONS

PCT International Search Report for International Application No. PCT/US2008/007256 dated Oct. 30, 2008 (3 pages).
PCT International Written Opinion for International Application No. PCT/US2008/007256 dated Oct. 30, 2008 (5 pages).

(Continued)

*Primary Examiner* — Sunit Pandya
*Assistant Examiner* — Allen Chan
(74) *Attorney, Agent, or Firm* — Nixon Peabody LLP

(57) ABSTRACT

A gaming system comprises a wager input device for receiving a primary wager and a display for displaying a primary wagering game. The gaming system further comprises a controller which is operative to (i) detect receipt of the primary wager, (ii) display a randomly selected outcome of the primary wagering game, (iii) display a feature icon on the display, (iv) detect selection of the feature icon, (v) in response to the selection of the feature icon, display a feature menu on the display, the feature menu displaying a plurality of available features capable of activation in addition to the wagering game, and (vi) in response to a first feature of the feature menu being selected, activate and display the first feature if a first eligibility requirement is satisfied.

24 Claims, 9 Drawing Sheets

U.S. PATENT DOCUMENTS

| | | | | |
|---|---|---|---|---|
| 2004/0005919 | A1* | 1/2004 | Walker et al. | 463/23 |
| 2004/0219968 | A1* | 11/2004 | Fiden et al. | 463/20 |
| 2005/0026670 | A1* | 2/2005 | Lardie | 463/16 |
| 2005/0085300 | A1 | 4/2005 | Johnson | 463/42 |
| 2005/0096121 | A1* | 5/2005 | Gilliland et al. | 463/20 |
| 2006/0019747 | A1 | 1/2006 | Loose et al. | 463/30 |
| 2006/0178199 | A1* | 8/2006 | Thomas | 463/20 |
| 2007/0004519 | A1 | 1/2007 | Swart et al. | 463/43 |
| 2007/0155469 | A1 | 7/2007 | Johnson | 463/17 |
| 2007/0167201 | A1* | 7/2007 | Schultz | 463/1 |
| 2007/0243925 | A1 | 10/2007 | LeMay et al. | 463/20 |
| 2007/0243934 | A1 | 10/2007 | Little et al. | 463/40 |
| 2008/0009344 | A1 | 1/2008 | Graham et al. | 463/25 |
| 2008/0113773 | A1 | 5/2008 | Johnson et al. | 463/25 |
| 2008/0113802 | A1 | 5/2008 | Johnson et al. | 463/40 |
| 2008/0161107 | A1 | 7/2008 | Johnson | 463/31 |
| 2008/0214299 | A1 | 9/2008 | Smith et al. | 463/29 |
| 2008/0274796 | A1 | 11/2008 | Lube | 463/25 |
| 2009/0036217 | A1 | 2/2009 | Blackburn et al. | 463/42 |
| 2009/0054135 | A1 | 2/2009 | Dabrowski | 463/25 |
| 2009/0098943 | A1 | 4/2009 | Weber et al. | 463/42 |
| 2009/0104954 | A1 | 4/2009 | Weber et al. | 463/1 |
| 2009/0117969 | A1 | 5/2009 | Englman | 463/20 |
| 2009/0143136 | A1 | 6/2009 | Thomas | 463/20 |
| 2009/0149253 | A1 | 6/2009 | Kelly et al. | 463/36 |
| 2009/0149254 | A1 | 6/2009 | Kelly et al. | 463/36 |
| 2009/0176568 | A1 | 7/2009 | Reddy et al. | 463/31 |
| 2009/0176572 | A1 | 7/2009 | Reddy et al. | 463/37 |
| 2009/0186692 | A1 | 7/2009 | Thomas et al. | 463/29 |
| 2009/0233705 | A1 | 9/2009 | LeMay et al. | 463/25 |
| 2009/0291752 | A1 | 11/2009 | Anderson et al. | 463/25 |
| 2009/0305776 | A1 | 12/2009 | Englman et al. | 463/25 |
| 2010/0029369 | A1 | 2/2010 | Pacey | 463/20 |
| 2010/0048283 | A1 | 2/2010 | Anderson et al. | 463/20 |
| 2010/0048293 | A1 | 2/2010 | Hornik | 463/25 |
| 2010/0062841 | A1 | 3/2010 | Englman et al. | 463/25 |
| 2010/0075746 | A1 | 3/2010 | Anderson et al. | 463/25 |
| 2010/0087256 | A1 | 4/2010 | Frattinger et al. | 463/42 |

OTHER PUBLICATIONS

Written Opinion corresponding to Australian Patent Application No. 2008267012, Australian Patent Office; dated Sep. 1, 2010; 2 pages.

Notice of Acceptance corresponding to Australian Patent Application No. 2008267012, Australian Patent Office; dated May 3, 2011; 1 page.

International Preliminary Report on Patentability corresponding to PCT/US2008/007256, United States Patent Office, dated Dec. 22, 2009; 6 pages.

* cited by examiner

GAMING SYSTEM HAVING GRAPHICAL FEATURE INTERFACE

CROSS REFERENCE TO RELATED APPLICATIONS

This application is a U.S. national stage of International Application No. PCT/US2008/007256, titled "Gaming System Having Graphical Feature Interface" and filed Jun. 11, 2008, which claims priority to U.S. Provisional Patent Application Ser. No. 60/936,174, titled "Gaming System Having Graphical Feature Interface" and filed on Jun. 19, 2007, each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a graphical feature interface.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Traditionally, wagering games have employed relatively smaller numbers of bonus or supplemental features. These features have been displayed to players in rather simplistic ways using primary or secondary displays on gaming machines. As the number and variation in available features increases, one problem that arises is that the presentation of these features via traditional means is disorganized and confusing. Another problem that exists is that the features are not easily navigable so that a player can quickly and easily locate desired features. Yet another problem lies in the difficulty of displaying available features without disturbing or encroaching on the display of the wagering game and unnecessarily utilizing display areas inefficiently. Moreover, such features traditionally have not been searchable. The present invention is directed to solving these and other problems.

SUMMARY OF THE INVENTION

According to one aspect of the present invention, a gaming system comprises a wager input device for receiving a primary wager and a display for displaying a primary wagering game. The gaming system further comprises a controller which is operative to (i) detect receipt of the primary wager, (ii) display a randomly selected outcome of the primary wagering game, (iii) display a feature icon on the display, (iv) detect selection of the feature icon, (v) in response to the selection of the feature icon, display a feature menu on the display, the feature menu displaying a plurality of available features capable of activation in addition to the wagering game, and (vi) in response to a first feature of the feature menu being selected, activate and display the first feature if a first eligibility requirement is satisfied.

According to another aspect of the invention, a method of operating a wagering game comprises receiving a primary wager from a player to activate a primary wagering game, and displaying a randomly selected outcome of the primary wagering game. The method further comprises displaying a feature icon and receiving a selection of the feature icon from the player. The method further comprises, in response to the feature icon being selected, displaying a feature menu on the display, the feature menu displaying a plurality of available features capable of activation in addition to the wagering game, and in response to a first feature of the feature menu being selected, activating and displaying the first feature in response to a first eligibility requirement being satisfied.

According to yet another aspect of the invention, a method of activating selectable features of a wagering game comprises receiving a primary wager from a player to activate a primary wagering game and displaying a randomly selected outcome of the primary wagering game. The method further comprises displaying on a first display a feature menu, the feature menu comprising a first set of available features capable of activation in addition to the wagering game. The method further comprises receiving a selection of a first feature from the first set, and in response to the first feature being selected, displaying a second set of features eligible for selection in accordance with a first rule set associated with the first feature.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
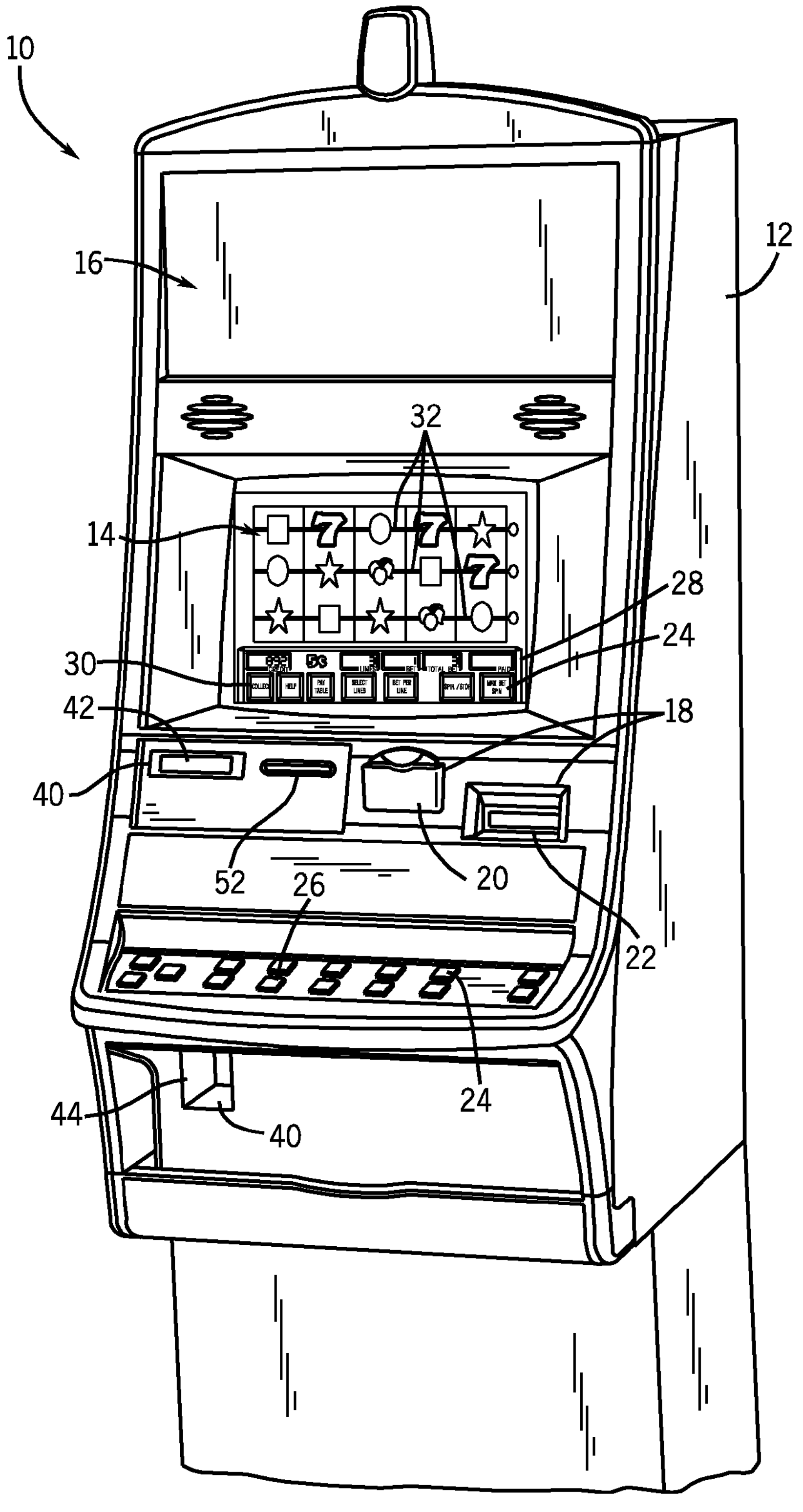
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
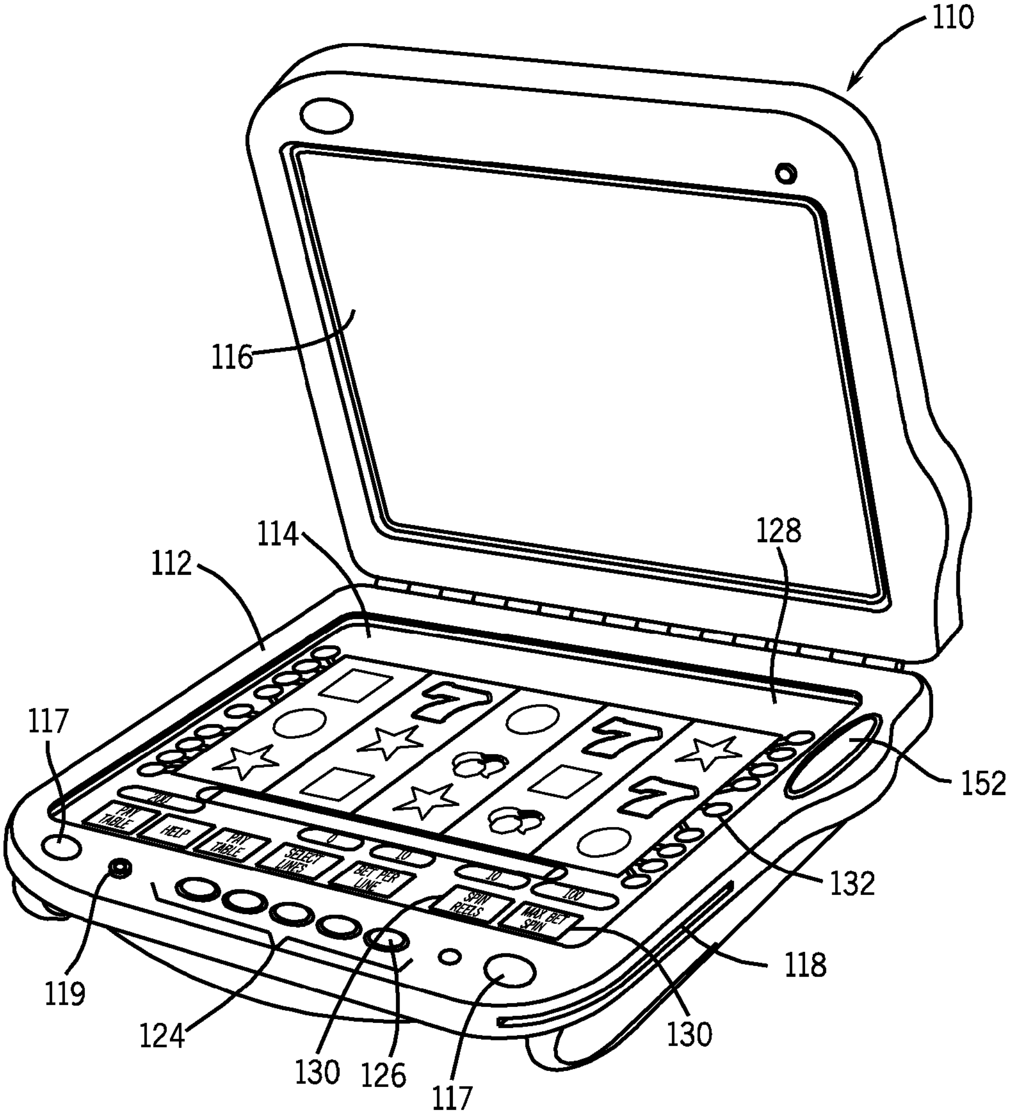
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
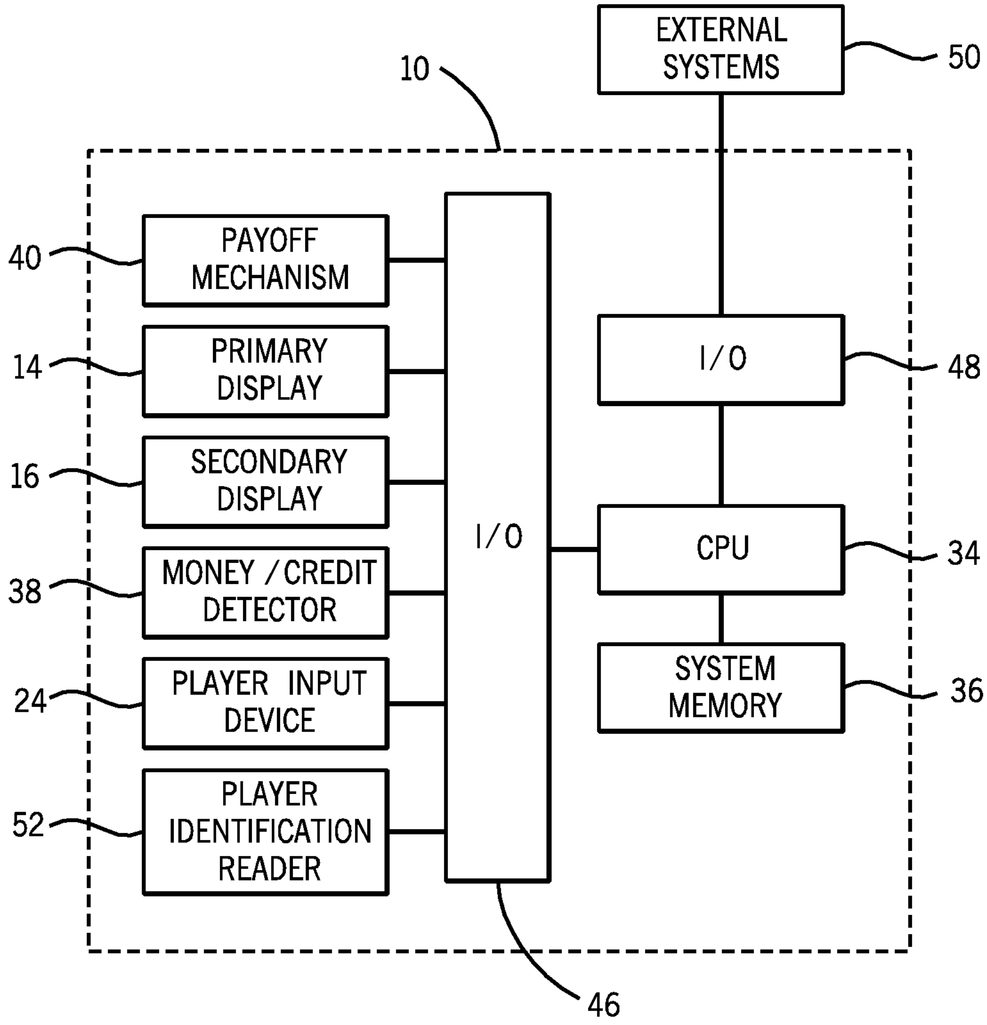
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
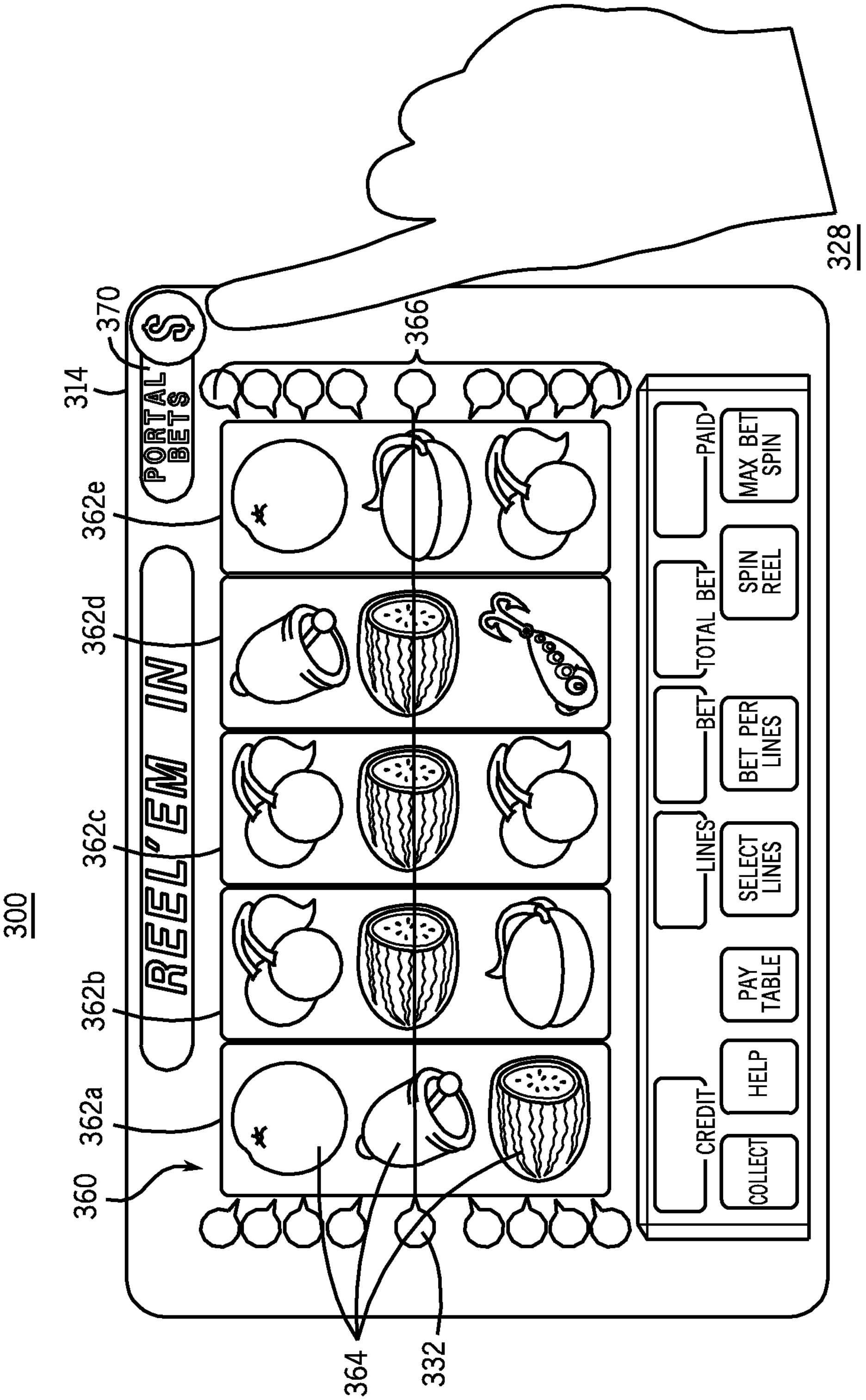
FIG. 3 is a screen shot of a primary display of a gaming system including a feature icon.

Turning now to FIG. 3, a primary display 314 of a gaming system 300 is shown. The primary display 314 may be any form of display such as those described herein with reference to the free standing and handheld gaming devices of FIGS. 1*a* and 1*b*. The primary display 314 includes a display of a primary wagering game 360, which in this embodiment is a slot game as shown in FIG. 3. The slot game 360 includes a plurality of reels 362*a,b,c,d,e* which may be either electromechanical reels or simulations thereof on the primary display 314. The reels 362*a,b,c,d,e* include a plurality of symbols 364 displayed thereon that vary as the reels 362*a,b,c,d,e* are spun and stopped. The symbols 364 may include any variety of graphical symbols, elements, or representations, including symbols 364 which are associated with one or more themes of the gaming machine or system. The symbols 364 may also include a blank symbol or empty space. As described herein the symbols 364 landing on the active paylines 332 (the paylines for which a wager has been received) are evaluated for winning combinations. If a winning combination of symbols 364 lands on an active payline 332 a primary award is awarded in accordance with a pay table of the gaming device. The symbols 364 on the reels 362*a,b,c,d,e* form an array 366 or matrix of symbols 364, having a number of rows and columns, which in the embodiment shown is four rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

The system 300 further includes a feature icon 370 for displaying and receiving selection and activation of various supplemental features to the wagering game 360. The feature icon 370 in FIG. 3 comprises a graphical icon or button entitled "Portal Bets." In other embodiments, other icons or graphics may be utilized, and may include isolated buttons, icons, or even a graphical bar or menu, for example across the top, bottom, or side of the display 314. The feature icon 370 can be selected or activated by a player of the wagering game 360 through a touch screen 328 overlying the display 314, or through any other appropriate player input device as described herein with relation to FIGS. 1*a*, 1*b*, and 2. In FIG. 3, the player is seen activating the feature icon 370 by selecting it via the touch screen 328.

Figure 4:
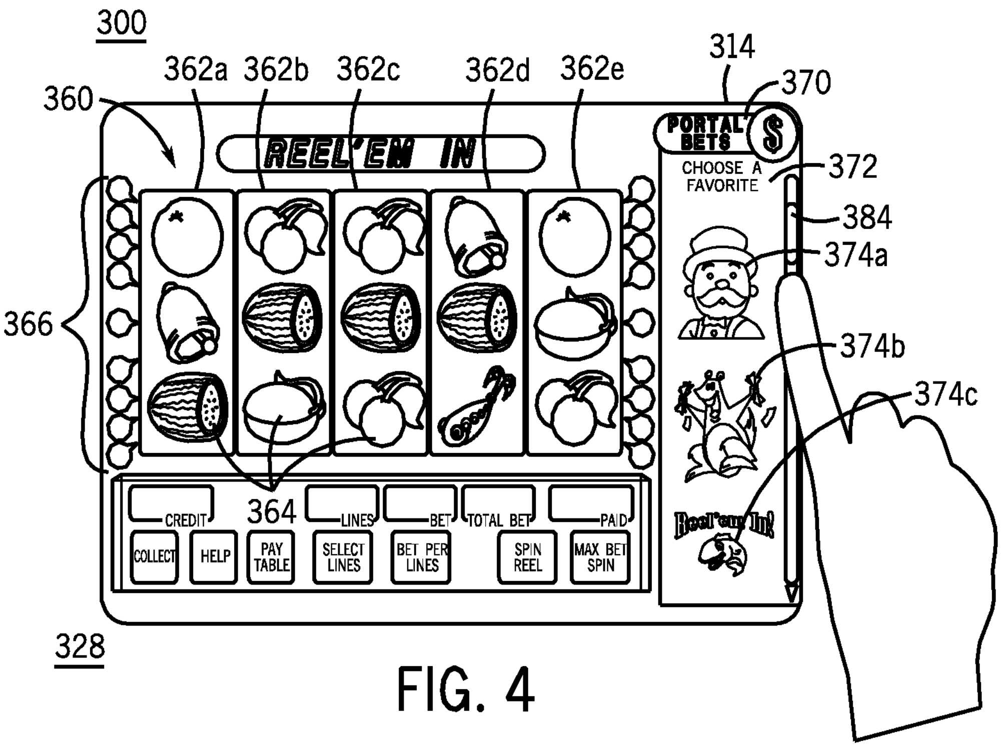
FIG. 4 is a screen shot of the primary display of FIG. 3 including a feature menu.

Turning to FIG. 4, once the feature icon 370 has been selected or activated, a feature menu 372 is displayed on the primary display 314 of the system 300. The feature menu 372 includes a plurality of available features 374 which are provided for activation or selection in addition to the primary wagering game 360. In FIG. 4, three available features 374*a,b,c* are shown which correspond to three different themed features, a Monopoly feature 374*a*, a Lucky Lemming feature 374*b*, and a Reel 'Em In feature 374*c*. Any one or more of the features 374*a,b,c* displayed may be activated by a player, in this embodiment, by touching the touch screen 328 at an appropriate location to select the desired feature or features 374*a,b,c*. In an embodiment, selection and activation of one of the features 374 requires input of an additional wager in the form of a secondary wager, side bet, or other monetary input. Thus, in one embodiment, selection of a desired feature 374 causes a player's wager account to be debited in an appropriate amount associated with the feature. In an alternative embodiment, one or more of the features 374 may be activated or selected without placing additional wagers or incurring additional fees. In yet another alternative embodiment, the cost of additional features 374 may be debited from or supplied by player loyalty points, frequent player points, comps, player tracking card points, a designated feature fund, or other collected secondary economy accounts, instead of or in addition to currency wagers.

In addition, the feature menu 372 includes a menu controller 384 for scrolling through visible and obscured selections. In this embodiment, the menu controller 384 is a scroll bar depicted on the right edge of the feature menu 372. For example, when the feature icon 370 is first selected, some of the plurality of available features 374 are displayed while others are obscured as being lower in the feature menu 372 window. The slider bar 384 may be utilized to scroll or slide down within the window of the feature menu 372 so as to reveal previously obscured features 374 that are available. In alternative embodiments, many other menu controllers 384 may be utilized instead of or in addition to the scroll bar. For example, the menu controller 384 may comprise a knob, wheel, joystick, or other physical controller such as Up and Down arrows or keys. Moreover, the menu controller 384 may comprise soft-key equivalents of these physical devices, such as a virtual knob, dial, page-up button, page-down button, arrows, wheels, roller balls, etc., which receive inputs through the touch screen 328 controlling movement of the features 374 in the feature menu 372.

The features 374 available for activation may take on many different forms, and are available to players in addition to one or more basic wagering games 360 of the system 300. Any number of wagering-game features 374 are available to be activated by a player of the gaming system 300. The features 374 may include any number of improvements, additions, enhancements, or modifications of a standard basic wagering game experience displayed on the primary display 314. For example, the features 374 may include eligibility or participation in bonus games, progressive jackpots or awards, or community games or events, including group games, team competitions, and competitive or collaborative play. The features 374 may also include wagering game assets such as free spins, wild symbols, multipliers, symbol upgrades, expanding wild symbols, scatter symbols, etc. The features 374 may also include eligibility or participation in secondary wagering games, side-bet games, reel re-spins, or extra chances or opportunities during play of the primary wagering games.

In other embodiments, the features 374 that may be activated may include features usable in a selection game, such as additional selections, opportunities to replace or re-do a prior selection, opportunities to undo a poor selection or selection of a terminating symbol, etc. Moreover, the features 374 may include eligibility or participation in enhanced awards, improvements of randomly selected outcomes of a primary wagering game, advancement to higher levels of play, advancement to newer or more favorable episodes of wagering games, etc. In yet other embodiments, features 374 may include eligibility and participation in additional wagering games, other games within a casino or gaming establishment (e.g., other table games or electronic games), wide area progressive jackpots, local area progressive jackpots, tangible prize awards, player reward points and loyalty programs, etc. The features 374 of the gaming system 300 as described herein may comprise any feature available on a wagering game which may be funded by an increased wager, a side wager, a secondary or separate wager, via player reward points, or in any other manner utilizing any form of currency, monetary input or other value.

It should also be understood that the features 374 activated in the system 300 of the present invention may be any number of available wagering game features as described herein. Moreover, the features 374 may include any enhancements or additions to the primary wagering game as described in detail in U.S. Patent Application Ser. No. 60/844,032 filed on Sep. 12, 2006, and US. Patent Application Ser. No. 60/802,984 filed on May 24, 2006, both of which are assigned to WMS Gaming Inc. Both such applications are hereby incorporated by reference, in their entirety, as if full set forth herein.

When the feature icon 370 is selected and the feature menu 372 appears, the display of the primary wagering game 360 may be altered or adjusted so as to accommodate the presence of the feature menu 372. In FIG. 4, for example, the randomly selected outcome of the primary wagering game 360 has been reduced in size, as compared to its original presentation in FIG. 3. The adjustment of the primary wagering game 360 may take on many forms. For example, the primary wagering game 360 may be resized, by either increasing the size or reducing the size of the wagering game 360 on the primary display 314. Adjustments in size may be done so as to preserve the aspect ration of the wagering game 360 (for example, the reduction from FIG. 3 to FIG. 4). In an alternative embodiment, the aspect ratio of the primary wagering game 360 may be altered, for example, by keeping the height of the wagering game 360 the same, and reducing or enlarging the width of the display of the primary wagering game 360, or vice versa, by adjusting the height while fixing the width. For example, in FIG. 5, the aspect ration of the primary wagering game 360 has been adjusted by reducing its width (and the width of the corresponding reels 362) to accommodate a wider, larger feature menu 372. In yet another alternative embodiment, the wagering game 360 may be moved on the primary display 314 to provide additional screen room for the feature menu 372. Other adjustment techniques are possible so as to provide additional room on the display 314 for the feature menu 372. Combinations of two or more of these adjustment techniques may also be utilized.

Figure 5:
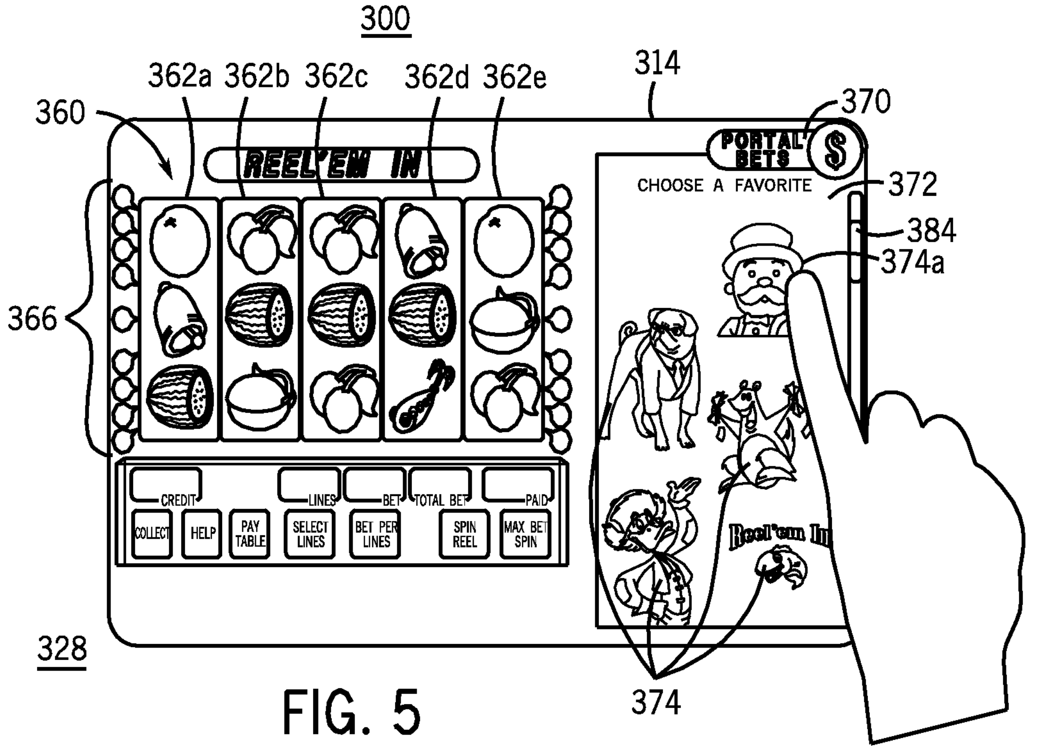
FIG. 5 is a screen shot of the primary display of FIG. 3 including an alternative feature menu.

In FIG. 5, an alternative configuration of a feature menu 372 is shown. The feature menu 372 again includes a plurality of features 374 which may be selected or activated in addition to the primary wagering game 360. The feature menu 372 of this embodiment is wider so as to display two columns of available features 374. The features 374 again are thematically related with an icon representing each feature 374, wherein the icons are associated with a theme of the feature 374. The display of the primary wagering game 360 has been reduced and the aspect ratio has been changed to accommodate the larger feature menu 372. The primary wagering game 360 is displayed with a width that is relatively narrower than the height creating a smaller aspect ratio that the original configuration of the wagering game 360 as seen in FIG. 3. As before, a player may activate or select one or more of the available features 374 by touching the touch screen 328 at an appropriate location. In FIG. 5, the player is selecting the Monopoly Big Event feature 374*a* that is shown and represented by the "Monopoly Man" icon on the feature menu 372. The feature menu 372 again includes a menu controller 384 in the form of a scroll bar.

Figure 6:
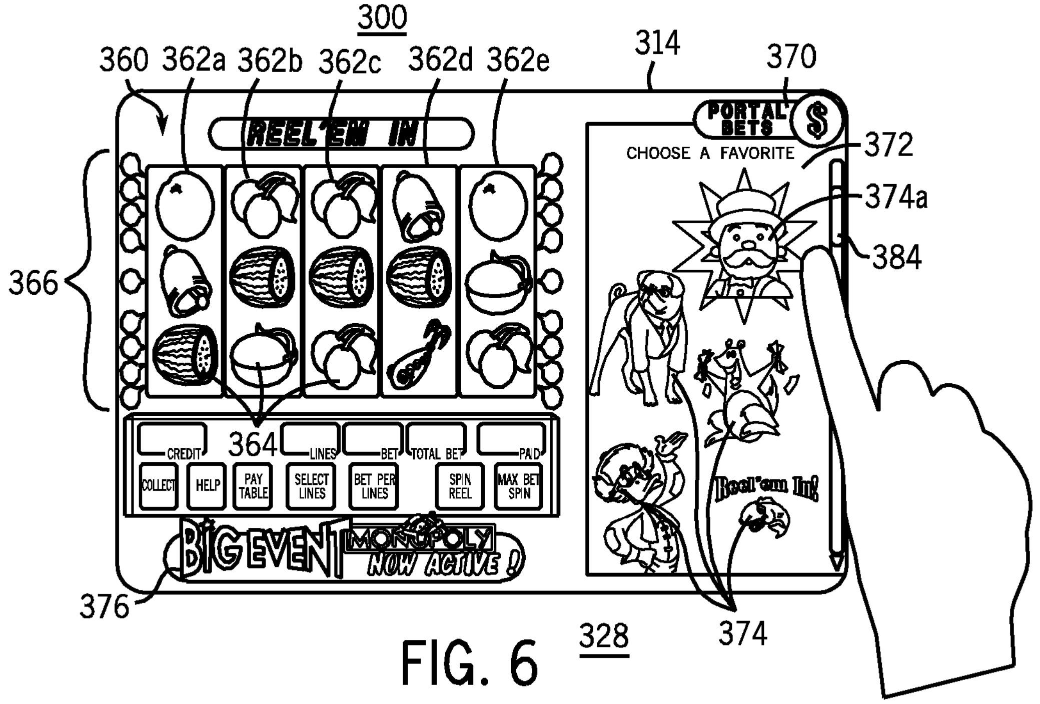
FIG. 6 is a screen shot of the primary display of FIG. 5 depicting selection and activation of a feature.

Turning to FIG. 6, the feature menu 372 highlights the selected feature 372*a* so as to signify its activation. Moreover, additional graphics, text, or both are applied to the primary wagering game 360 to inform the player as to the activation of the feature. In the embodiment shown, the Monopoly Big Event feature 374*a* has been selected and activated, so the display 314 now includes a feature information display 376, which in this case are the text and graphics below the reels 362 that "Monopoly Big Event Now Active!" The feature information display 376 may comprise any form of text or graphics on the primary display 314 (or other displays), which announces or depicts to the player information as to the status, selection, activation, or execution of one or more features 374 on the feature menu 372. Again, the feature menu 372 again includes a menu controller 384 in the form of a scroll bar.

Figure 7:
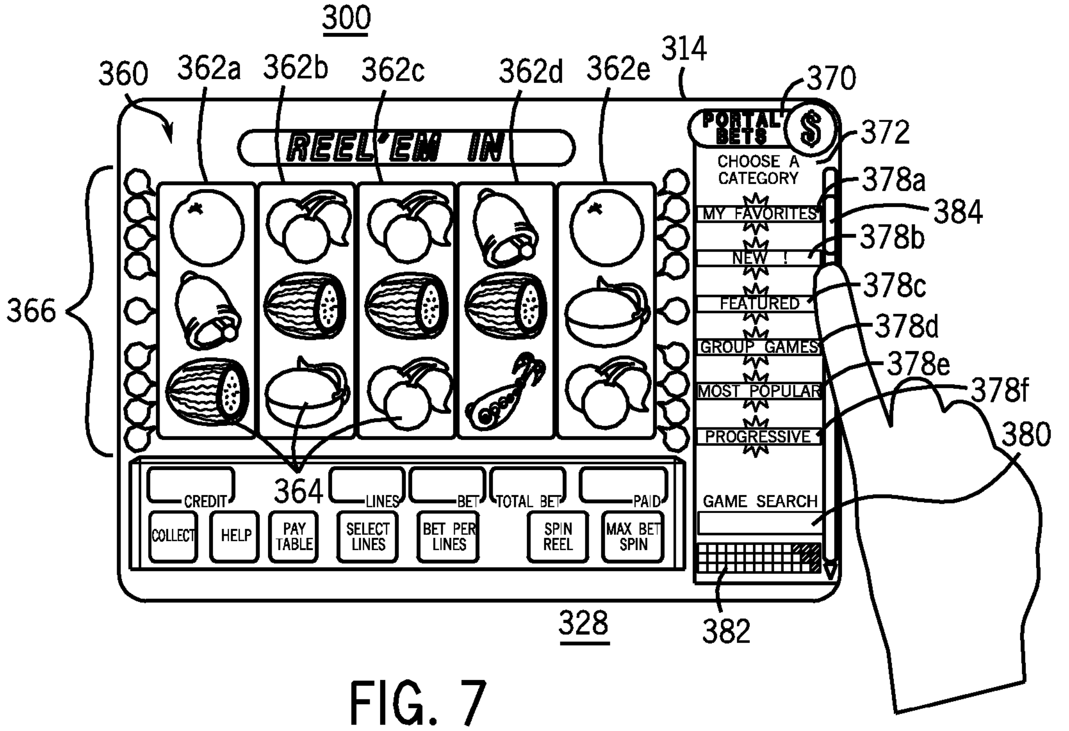
FIG. 7 is a screen shot of a primary display including a feature menu having a plurality of channels.

An alternative embodiment of the gaming system 300 is shown in FIG. 7. As before, selection of the feature icon 370 causes display of a feature menu 372. In this embodiment, the feature menu 372 includes a plurality of channels 378 or categories. The channels 378 include a variety of different categories or groups in which a plurality of features 374 are organized or categorized. As used herein, the term "channel" refers to a grouping of features 374 having one or more criteria in common. The channels 378 may be displayed so as to provide a label or other graphical display informing the player as to the nature of the criteria shared by the features 374 contained therein. The channels 378 include features 374 organized on the basis of criteria such as feature theme, feature popularity, feature type, favorite feature(s), feature volatility, feature cost, and feature jackpot type. Many different varieties of categories may be used to organize the channels 378 and sort the features 374 thereby. As shown in FIG. 7, the channels 378 include a My Favorites channel 378*a*, a New channel 378*b*, a Featured channel 378*c*, a Group Games channel, 378*d*, a Most Popular channel 378*e*, and a Progressives channel 378*f*.

The My Favorites channel 378*a* may be employed by a player to remember, store and recall favorite features 374 of that player. For example, the player may manually associate certain desired features 374 with his or her My Favorites channel 378*a*, perhaps stored in associated with a player identifier, for recall during future gaming sessions. Alternatively, one or more algorithms may be employed by a controller of the gaming system 300 so as to automatically track players frequently selected features 374 and store those in the My Favorites channel 378*a* or other channels 378. Moreover, the My Favorites channel 378*a* may be populated with casino or operator favorite features 374. In addition, the features 374 stored within a My Favorites channel 378*a* may be capable of being shared by a player with another player, friend, relative, etc. by transmitting or copying the data stored in the My Favorites channel 378*a* from one player identifier to another. The New channel 378*b* may include recently released, created, or updated features providing an avenue for a player to easily find fresh content in the way of features 378. The Featured channel 378*c* may include certain selected features 374 for certain periods of time so as to promote features 374 which many be more attractive to certain players, during certain times or seasons, or to certain player demographics or player types. Again, one or more algorithms may be employed to create and maintain the desired features 374 in the Featured channel 378*c*.

The Group Games channel 378*d* may offer a selection of features 374 which comprise group wagering games such as collaborative, competitive, and team play games. The Most Popular channel 378*e* may offer a selection of features 374 which has been rated as most popular, either through voluntary player voting, or through some algorithm monitoring which features 374 are most often selected by players. The Progressives channel 378*f* may include features 374 comprising progressive jackpots so as to appeal to players looking for progressive awards, which tend to be larger than non-progressive awards. Other categories of channels 378 may be employed, such as channels 378 grouping features 374 based upon gambling, volatility, cost, theme, etc. In addition, the feature menu 372 includes a menu controller 384 for scrolling through visible and obscured selections, in this case channels 378. In this embodiment, the menu controller 384 again is a scroll bar depicted on the right edge of the feature menu 372.

In addition, the feature menu 372 in FIG. 7 includes a search field 380 and a search query input device 382. In the embodiment shown, the search field 380 and search query input device 382 are shown as part of the feature menu 372, but it should be understood that these elements may be provided and displayed in other locations, such as elsewhere on the primary display 314, another display of the gaming system 300, or via another player input device of the system 300. In FIG. 7, the search field 380 is shown on the feature menu 372 and includes a search field box for viewing the input to be searched for. The search query input device 382 is a plurality of alphanumeric soft keys 384 of the touch screen 328 for inputting alphanumeric information into the search field 380. Search queries input into the search field 380 are processed by a controller of the gaming system 300, which compares the search queries with the available features 374, and returns search results of compatible features 374 satisfying the search request. From the returned list, a player may choose to activate some, all, or none of the matching features 374, or may continue to do additional or refined searching of the results. As with the embodiment in FIG. 6, a menu controller 384 (again in the form of a slider bar) is provided so as to be able to scroll through visible selections and obscured selections. In this embodiment, however, the selections on the feature menu 372 are channels 378 rather than individual features 374. When a channel 378 is selected, however, a further submenu may be displayed which displays the individual features 374 falling into the category of the selected channel 378. It should be understood that features 374 may fall into more than one category 378, and thus may be listed under each appropriate associated channel 378 in the feature menu 372.

In addition to the queries described above, other queries may be searchable via the query input device 382. For example, the query input may search based upon a name of a feature 374, a type of feature 374, etc. Moreover, criteria such as a most played theme or feature 374, highest paying jackpot awarded, longest time since jackpot awarded, most frequently paying jackpot, etc. may be searched via the query input device 382. In other embodiments, a player may search for features 374 based upon how many other players are participating in them, denomination, time of executing, nature of feature, or other criteria. In other words, a large number or list of criteria associated with the various features 374 may be searchable via the query input device 382 and search field 384, with the search results returning features 374 having the desired criteria.

Figure 8:
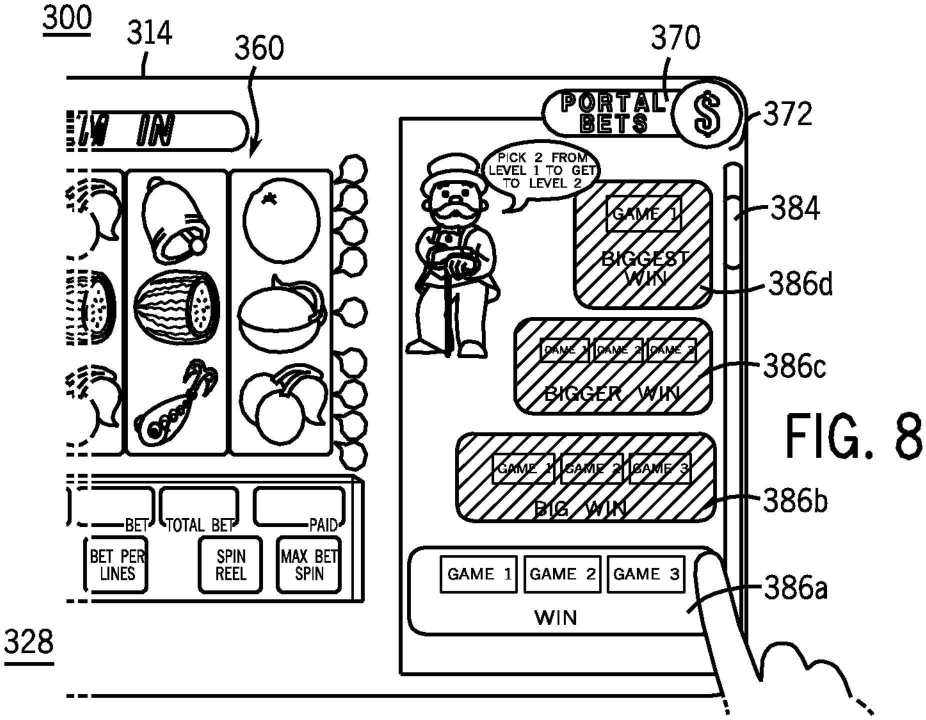
FIG. 8 is a screen shot of a primary display including a feature menu having a graphically displayed rule set.
Figure 9:
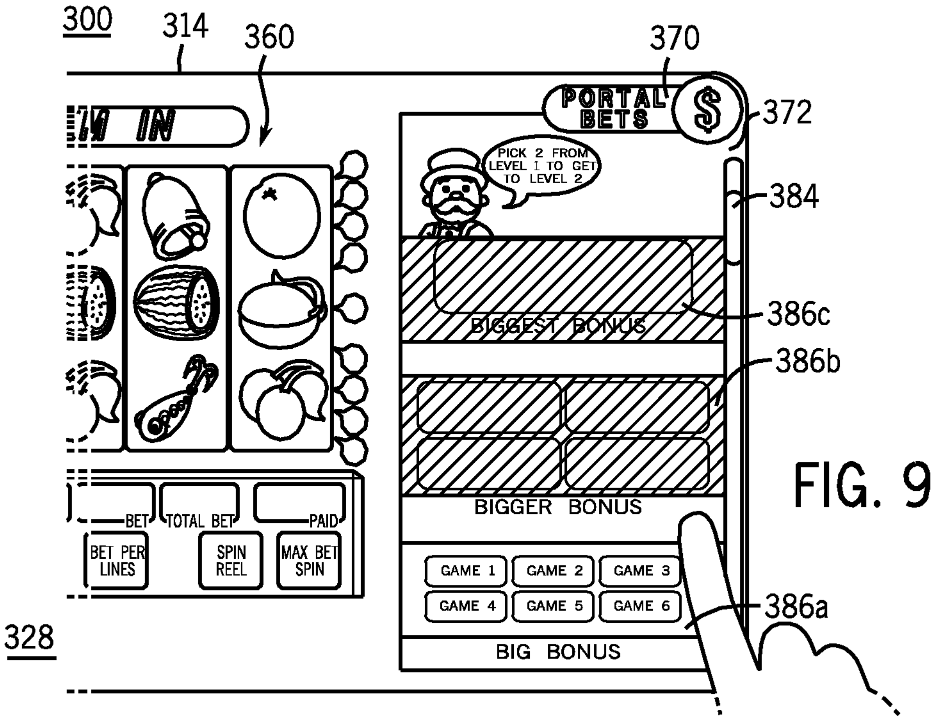
FIG. 9 is a screen shot of a primary display including an alternative feature menu having a graphically displayed rule set.

Turning to FIGS. 8 and 9, yet other alternative embodiments of the feature menu 372 is displayed as shown on the primary display 314. In these embodiments, the feature menu 372 includes a plurality of levels or tiers 386*a,b,c,d*, with each tier 386*a,b,c,d* having one or more features 374 therein. The tiers 386*a,b,c,d* may be organized in any logical and appropriate fashion, and in an embodiment, increasing levels of tiers 386*a,b,c,d* provide higher expected rates of return or payback percentages. Thus, in such embodiments, in exchange for activating multiple features (one or more for each tier 386) a player is rewarded with increasing levels of payback percentages. In other embodiments, the organization of the tiers 386 may be according to different criteria. Each successively higher tier 386 has a rule set, or eligibility requirement which may need to be satisfied in order for a player to be permitted to select from or activate features 374 within such tier 386. For example, as seen in FIGS. 8 and 9, a player must activate two of the features 374 in the Level 1 tier 386*a* (where the player's finger is pointing), in order to be eligible to select any features 374 in the second tier 386*b*. Such rules or criteria may be communicated to the player via the feature menu 372 or elsewhere on the primary display 314 or other display. In this instance, the Mr. Monopoly character informs the player of the eligibility requirement explained by stating "Pick 2 from Level 1 to get to Level 2." Additionally, the Level 2 tier 386*b* (as well as Levels 3 and 4 386*c,d*) are shown as "grayed out" or ghosted so as to signify their inactive status until the eligibility requirements have been satisfied so as to unlock or activate such tiers 386*b,c,d*. Once the player succeeds in satisfying the rule set and eligibility is met, the appropriate tier 386*b* will be activated, the ghosting will be removed, and the features 374 in such tier 386*b* will be available for selection.

A variety of graphical depictions of such rule sets or eligibility criteria may be used so as to communicate the content of those rule sets to the player. For example, the physical hierarchy of FIGS. 8 and 9 may be used to show successively higher levels stacked on top of lower levels. In other embodiments, lines, arrows, or other mapping graphics may be used so as to show one or more paths linking features 374 which are locked or unlocked based upon the selection or activation of other features 374. For example, the graphics may be generated dynamically such that when one feature 374 is selected, all other available features 374 which become eligible as a result thereof are mapped to the selected feature with lines or arrows. Thus, a player can follow a path of linked or associated features 374 by making successive selections thereof. Yet another method of showing such dependent feature scheme involves stacking the features in a pyramid to show higher levels becoming available as criteria in lower levels is satisfied.

Figure 10:
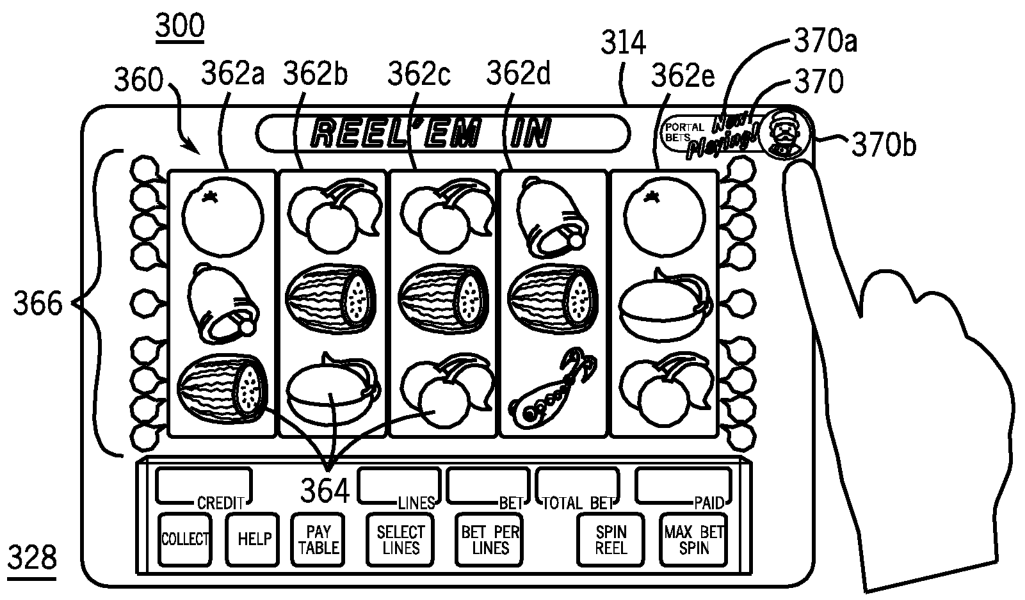
FIG. 10 is a screen shot of a primary display including a dynamic feature icon.

In FIGS. 10-13, yet another alternative embodiment of the gaming system 300 is depicted in which the feature icon 370 comprises a dynamically changing and updating graphic to display information regarding available and activated features 374 to the player. As seen in FIG. 10, the feature icon 370 again is shown in the upper right hand corner of the primary display 314. In this embodiment, the feature icon 370 includes a first, or static portion 370*a*, and a second or dynamic portion 370*b*. The static portion 370*a* of the feature icon 370 is used to continually communicate the significance, location and status of the feature icon 370 to the player. In this embodiment, the static portion 370 includes the words "Portal Bets" to signify that this is the feature icon 370, and the words "Now Playing" to signify that information contained in the dynamic portion 370*b* is currently available, engaged, or selected. The dynamic portion 370*b* contains changing or cycling information. In an embodiment, the dynamic portion 370*b* may advertise available features 374 to a player by displaying features 374 for a predetermined time (e.g. 5 seconds) and then proceeding to show other available features 374. In another embodiment, the dynamic portion 370*b* may change to show which features 374 have already been activated or selected by the player, so as to remind the player of which features 374. For example, in the embodiment shown in FIGS. 10-13, the player has previously selected and activated three features 374*a,b,c*, corresponding to the Monopoly Big Event feature 374*a*, the Lucky Lemmings feature 374*b*, and the Slotsky feature 374*c*, as seen by the graphics displayed in the dynamic portion 370*b* of the icon 370.

Figure 11:
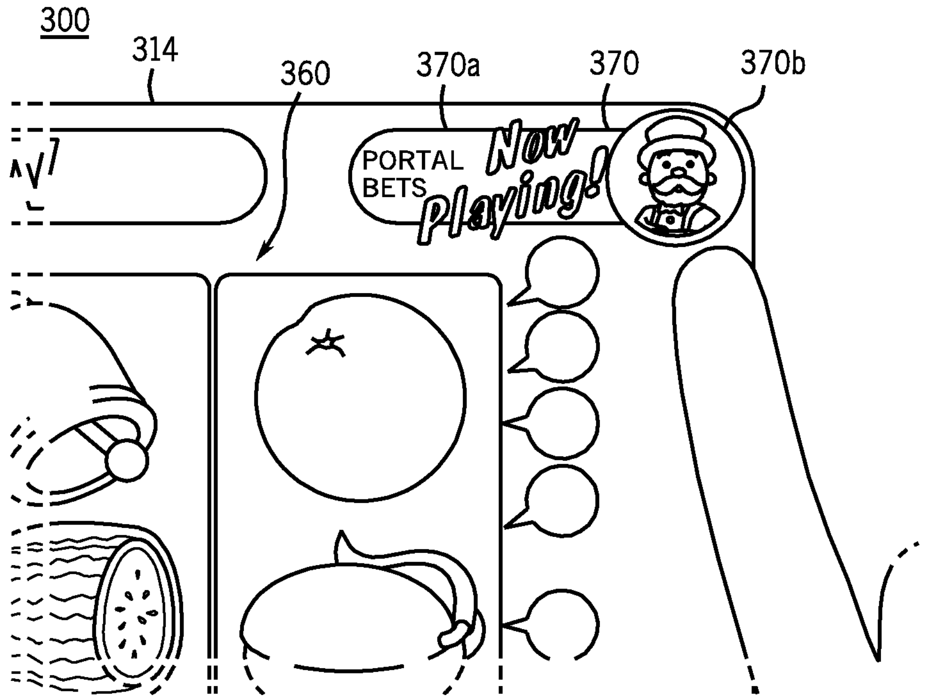
FIG. 11 is a screen shot of the dynamic feature icon of FIG. 10.
Figure 12:
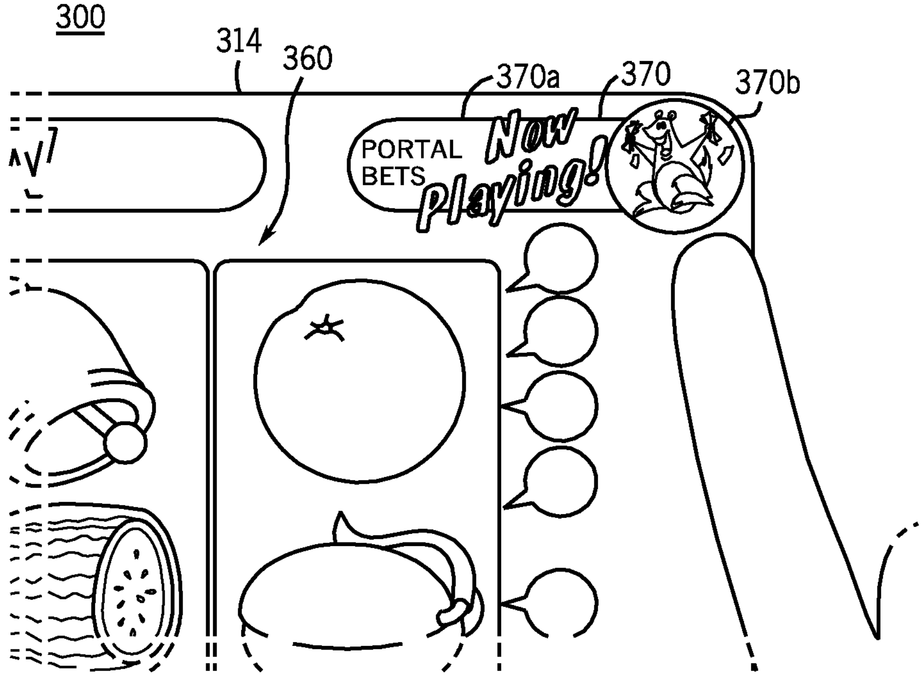
FIG. 12 is a screen shot of the dynamic feature icon of FIG. 11 depicting an alternative feature.
Figure 13:
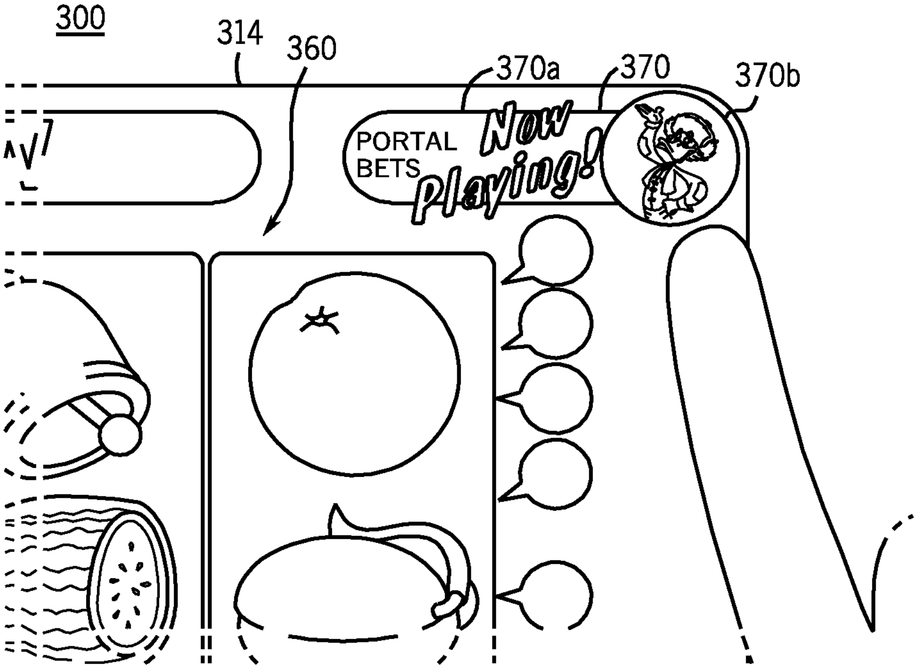
FIG. 13 is a screen shot of the dynamic feature icon of FIG. 11, depicting yet another alternative feature.

Thus, in FIGS. 10 and 11, the feature icon 370 communicates to the player that the Monopoly Big Event feature 374*a* is active. This is done by the static portion 370*a* of the icon 370 stating the feature 374*a* is "now playing" and the dynamic portion 370*b* of the icon 370 displaying the Monopoly icon representing the Monopoly Big Event feature 374*a* being active. After a period of time, the display 314 cycles to FIG. 12 where the feature icon 370 displays that the Lucky Lemming feature 374*b* is active as displayed in the dynamic portion 370*b* of the icon 370. After yet another period of time, the display 314 cycles again to display the screen shown in FIG. 13, where the Slotsky feature 374*c* is shown as active in the dynamic portion 370*b* of the icon 370. In this way, when a player has activated three features 374*a, b,c*, the activated features 374*a,b,c* are cycled and shown to the player via the dynamic portion 370*b* of the feature icon 370 to remind the player as to which features 374 he or she has activated and is playing. The changing or cycling of the active features 374*a,b,c* in the feature icon 370 may be done in accordance with a fixed pattern (e.g. 5 seconds for each active feature 374*a,b,c*), may be random, or may be customizable to a desired value by an operator or player of the gaming system 300. Moreover, any variety of graphics and/or text may be used to communicate the currently activated features 374*a, b,c* to the player via the feature icon 370.

In an alternative embodiment, the feature icon 370 is customizable by the player, user, or operator of the gaming system 300. For example, a player may customize the size, color, theme, or other attributes of the feature icon 370. Moreover, the player may customize the location of the feature icon 370 on the primary display 314 relative to the primary wagering game 360, or other graphics displayed thereon. Some players, for example, may prefer that the feature icon 370 be located at the top right corner of the primary display 314 as shown in the FIGURES, while other prefer a different location. The feature icon 370 may be configured so as to be capable of being dragged and dropped across the primary display 314 at the desired location. Moreover, players may customize the type or style of the feature icon 370. Some players, for example, may prefer the button version of the feature icon 370 shown in the FIGURES, while other players may prefer a tool bar type of configuration such that the icon 370 is displayed along one edge of the display 314. In alternative embodiments, the feature icon 370 may be any one of a variety of graphics, which the player recognizes as initiating the feature menu 372. One or more of these preferences or customization options may be associated with a player identifier such that when a player activates a wagering game on the gaming system 300, the preferences are automatically recalled and the primary display 314 is configured in accordance with the player's stored customization options.

In yet other alternative embodiments, the various channels 378 employed on a feature menu 372 may be customizable by a player as well. A player may customize which channels 378 are displayed, at what times, and in what formats, graphically or otherwise. Moreover, these preferences may also be stored and associated with a player identifier for future recall, as described above herein. In yet other alternative embodiments, one or more software algorithms may be used to study, record, analyze and process player selection of features 374, channels 378, etc. Such algorithms could then process the available features 374 and channels 378 to make available for selection those choices, which are most probable to be selected by a player based upon the criteria monitored previously. In this way, the algorithms can provide an "intelligent menu" or "smart menu" which monitors prior player selections and history, and configures future selections in accordance with such monitored history.

Moreover, players can customize their player profiles associated with player identifiers so as to have different modes, groups, or packages. For example, a player may have a profile which is a "Gambler" profile, which in turn causes the displayed features 374 and channels 378 of the feature menu 372 to be only those items meeting certain criteria associated with the selected profile. In such an example, the features 374 displayed, for example, may be only high volatility features meeting the "Gambler" criteria. By allowing players to store multiple profiles, the players can easily change back and forth from one profile to another, thereby affecting the displayed features 374 and channels 378 available for selection. Moreover, one or more profiles may have features 374 associated therewith that are automatically activated and selected when the profile is activated. Thus, when a player activates his "Gambler" profile, the features 374 associated with it are automatically activated. This obviates the need for the player to manually activate each desired feature 374 each time he wishes to employ them, and provides the player with a way to "pre-package" certain desired features 374 into groups for activation together.

The system 300 as described and shown in various embodiments herein, offers a number of advantages over traditional systems. The feature icon 370 of the present system 300 provides a player with an easily recognizable location and method of activating supplemental features 374 without having to search for and learn methods that are unique to various games. In this way, the feature icon 370 centralizes the available features for selection and provides the player with a way of quickly and easily locating, activating, and selecting desired features. Moreover, the feature menu 372 and channels 378 provide an organized display of the various available features 374 such that the player can easily locate, navigate, search for, and activate only those features that he wishes to employ. In addition, the graphic display of rule sets within the feature menu 372 provides an easily understood visual representation of which features 374 are linked with other features for activation, and in what way they are linked.

Each of these embodiments and obvious variations thereof is contemplated as falling within the spirit and scope of the claimed invention, which is set forth in the following claims.

What is claimed is:

1. A gaming system comprising:

a wager input device for receiving a primary wager;

a display for displaying a primary wagering game; and a controller operative to:

(i) detect receipt of the primary wager;

(ii) display a randomly selected outcome of the primary wagering game;

(iii) display a feature icon on the display;

(iv) detect selection, by a player, of the feature icon;

(v) in response to the selection of the feature icon by the player, display a feature menu on the display, the feature menu displaying a plurality of features in a dependent feature scheme wherein at least one second feature of the plurality of features is unlocked from a locked state and made available for selection by the player only if at least one first feature of the plurality of features has been selected by the player, the at least one second feature being initially displayed on the display in the locked state; and (vi) in response to the at least one first feature of the plurality of features being selected by the player, unlock the at least one second feature to be available for selection by the player, and activate the at least one first feature in addition to the primary wagering game.

2. The system of claim 1, wherein the wager input device is also for receiving one or more secondary wagers, the primary wager for activating the randomly selected outcome of the primary wagering game, the one or more secondary wagers for activating one or more of the plurality of features.

3. The system of claim 1, further comprising a touch screen overlying the display, the selection of the feature icon being input via the touch screen.

4. The system of claim 1, wherein the feature menu overlies a portion of the displayed randomly selected outcome.

5. The system of claim 1, wherein the controller is further operative to adjust the display of the randomly selected outcome in conjunction with displaying the feature menu.

6. The system of claim 5, wherein adjusting the display of the randomly selected outcome comprises one of resizing, moving, and changing the aspect ratio of the randomly selected outcome.

7. The system of claim 1, wherein the feature icon varies over time to display two or more of the plurality of features.

8. The system of claim 1, wherein the feature menu comprises a menu controller, wherein a first portion of the plurality of features is initially visible and a second portion of the plurality of features is initially obscured, wherein activation of the menu controller causes the second portion to become visible.

9. The system of claim 1, wherein the feature menu comprises a plurality of channels and the plurality of features are organized within the plurality of channels.

10. The system of claim 9, wherein one or more of the plurality of channels is associated with one or more of a feature theme, a feature popularity, a feature type, a favorite feature, a feature volatility, a feature cost, or a feature jackpot type.

11. The system of claim 1, wherein the feature menu comprises a search field for receiving a feature search query input.

12. A method of operating a wagering game comprising:

in response to an input via at least one input device, receiving a primary wager from a player to activate a primary wagering game;

displaying on at least one display device a randomly selected outcome of the primary wagering game;

displaying on the display device a feature icon;

receiving a selection, by a player via the at least one input device, of the feature icon;

in response to the feature icon being selected, displaying a feature menu on the display device, the feature menu displaying a plurality of features in a dependent feature scheme wherein at least one second feature of the plurality of features is unlocked from a locked state and made available for selection by the player only if at least one first feature of the plurality of features has been selected by the player, the at least one second feature being initially displayed on the display device in the locked state; and in response to the at least one first feature of the plurality of features being selected by the player via the at least one input device, unlocking the at least one second feature to be available for selection by the player, and activating, by one or more processors, the at least one first feature in addition to the primary wagering game.

13. The method of claim 12, wherein the feature menu includes a plurality of tiers to which the plurality of features are assigned, each successively higher tier being locked until a corresponding eligibility requirement is met for that tier.

14. The method of claim 13, further comprising communicating on the at least one display device the eligibility requirement for unlocking one or more of the plurality of tiers.

15. The method of claim 13, wherein any locked tiers of the plurality of ties are displayed in an inactive mode until a respective eligibility requirement is met.

16. The method of claim 12, wherein the feature menu displays a path of linked ones of the plurality of features, the path including graphics generated dynamically to show all available features upon selection of one of the plurality of features.

17. A method of activating selectable features of a wagering game comprising:

in response to an input via at least one input device, receiving a primary wager from a player to activate a primary wagering game;

displaying on at least one display device a randomly selected outcome of the primary wagering game;

displaying on the at least one display device a feature menu having a plurality of tiers in a dependent feature scheme including a plurality of features, a second tier of the plurality of tiers being a successively higher tier than a first tier of the plurality of tiers, the second tier being initially displayed on the display device in a locked mode and the first tier being initially displayed on the display device in an unlocked mode;

receiving a selection, by a player via the at least one input device, of at least one first feature from the first tier and activating, by at least one of one or more processors, the at least one first feature in addition to the primary wagering game; and in response to the at least one first feature of the first tier being selected, unlocking the second tier from the locked mode, by at least one of the one or more processors, to have a second feature from the second tier available for selection by the player.

18. The method of claim 17, further comprising dynamically changing graphic information on the at least one display device to display available and activated features of the plurality of features.

19. The method of claim 17, further comprising displaying a visual association linking the at least one first feature and one or more features of the second tier, including the second feature.

20. The method of claim 17, further comprising:

displaying on the display device a feature icon having a static portion and a dynamic portion;

receiving a selection, by a player, of the feature icon; and in response to the feature icon being selected, displaying the feature menu on the at least one display device.

21. The method of claim 20, further comprising communicating in the static portion of the feature icon at least one of a significance, location, and status of the feature icon to the player.

22. The method of claim 20, further comprising communicating in the dynamic portion of the feature icon cycling information for a predetermined time, the cycling being in accordance with one or more of a fixed pattern, a random pattern, or a customizable pattern.

23. The method of claim 22, wherein the cycling information includes available features of the plurality of features.

24. One or more non-transitory computer readable storage media encoded with instructions for performing the method of claim 17.

* * * * *

UNITED STATES PATENT AND TRADEMARK OFFICE

CERTIFICATE OF CORRECTION

PATENT NO. : 8,425,304 B2
APPLICATION NO. : 12/665632
DATED : April 23, 2013
INVENTOR(S) : Gagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 312 days.

Signed and Sealed this
Eighth Day of September, 2015

Michelle K. Lee
*Director of the United States Patent and Trademark Office*